United States Patent [19]
Ganzi et al.

[11] Patent Number: 5,308,466
[45] Date of Patent: May 3, 1994

[54] ELECTRODEIONIZATION APPARATUS

[75] Inventors: Gary C. Ganzi, Lexington; Frederick Wilkins, Pepperill; Anthony J. Giuffrida, Andover; Christopher Griffin, Merrimack, all of Mass.

[73] Assignee: IP Holding Company, Wilmington, Del.

[21] Appl. No.: 841,021

[22] Filed: Feb. 25, 1992

Related U.S. Application Data

[63] Continuation-in-part of Ser. No. 628,338, Dec. 17, 1990, abandoned.

[51] Int. Cl.⁵ ................... B01D 61/44; C02F 1/469
[52] U.S. Cl. ........................ 204/151; 204/182.4; 204/182.5; 204/301
[58] Field of Search ............ 204/301, 182.4, 182.5, 204/151

[56] References Cited

U.S. PATENT DOCUMENTS

| | | | |
|---|---|---|---|
| 2,689,826 | 9/1954 | Kollsman | 204/301 |
| 2,815,320 | 12/1957 | Kollsman | 204/182.4 |
| 2,854,394 | 9/1958 | Kollsman | 204/180 |
| 2,923,674 | 2/1960 | Kressman | 204/180 |
| 3,014,855 | 12/1961 | Kressman | 204/180 |
| 3,149,061 | 9/1964 | Parsi | 204/180 |
| 3,291,713 | 12/1966 | Parsi | 204/180 |
| 3,330,750 | 7/1967 | McRae | 204/180 |
| 4,032,452 | 6/1977 | Davis | 204/243 |
| 4,632,745 | 12/1986 | Giuffrida et al. | 204/182.4 |
| 4,804,451 | 2/1989 | Palmer | 204/301 |
| 4,822,471 | 4/1989 | MacDonald | 204/301 |
| 4,871,431 | 10/1989 | Parsi | 204/182.4 |
| 4,923,611 | 5/1990 | Hanada et al. | 210/638 |
| 4,925,541 | 5/1990 | Giuffrida et al. | 204/182.5 |
| 4,931,160 | 6/1990 | Giuffrida | 204/301 |
| 4,956,071 | 9/1990 | Giuffrida et al. | 204/301 |
| 4,969,983 | 11/1990 | Parsi | 204/182.4 |
| 5,154,809 | 10/1992 | Orem et al. | 204/182.4 |

FOREIGN PATENT DOCUMENTS

| | | |
|---|---|---|
| 0032021 | 12/1979 | European Pat. Off. . |
| 0417506 | 9/1989 | European Pat. Off. . |
| 0364502 | 12/1989 | European Pat. Off. . |
| 3808043A1 | 9/1989 | Fed. Rep. of Germany . |
| WO89/00453 | 1/1989 | PCT Int'l Appl. . |

OTHER PUBLICATIONS

"Donnan Dialysis Concentration Using Cation Exchange Membrane Prepared by Paste Method", J. Chem. Eng. Japan, vol. 23, No. 6, 1990 pp. 280–685 (Sudoh).
"The Application of Electrodialysis to Demineralization", AIChE Symposium Series No. 9, 1965, pp. 79–83 (Gittens).
"Some Aspects of the High Frequency Conductance of Electrolytes" J. Electrochem. Soc., vol. 136, No. 10 (Ghowsi) Oct. 1989.
Gittens, G. H., Watts, R. E., *Some Experimental Studies of Electrodeionisation Through Resin Packed Beds*, Mar., 1964, U.K.A.E.A. Research Group, pp. i–33.
Matejka, Z., *Continuous Production of High-Purity Water by Electrodeionization*, J. Appl. Chem. Biotechnol 1971, vol. 21 (April).
Strathmann, H. and Kock, K., *Effluent Free Electrolytic Regeneration of Ion-Exchange Resins, pp. 145–158 (1982)*.
Glueckauf, E., *Electro-Deionization Through a Packed Bed*, Dec. 1959, pp. 646–651, British Chemical Engineering.
"Dialytic Properties of Domestic Ion-Exchange Membranes for Desalination of Saline Water by Electrodialysis", Environmental Protection Engineering, vol. 15, No. 3–4, pp. 155–162, (1989).
Grazyna & Jacek Wisniewska, *Dialytic Properties of Domestic Ion-Exchange Membranes for Desalination of Saline Water by Electrodialysis* Environment Protection Engineering, vol. 15, 1989 pp. 155–162.

*Primary Examiner*—John Niebling
*Assistant Examiner*—Arun S. Phasge
*Attorney, Agent, or Firm*—Wolf, Greenfield & Sacks

[57] ABSTRACT

An electrodeionization apparatus is provided for removing ions from liquids. The apparatus is particularly well adapted for the removal of large, heavily hydrated, highly charged or weakly ionized molecules or complexes from feed water. Such removal is achieved by substituting, in at least one section of the apparatus, ion exchange membranes and/or resins having lower crosslinking and/or lower selectivity, for the ion exchange membranes commonly used in electrodeionization systems. Methods for reducing the electrical resistance across the membrane also are provided.

22 Claims, 5 Drawing Sheets

ELECTRODEIONIZATION APPARATUS

This application is a continuation in-part of U U.S. patent application Ser. No. 628,338 filed Dec. 17, 1990, now abandoned.

FIELD OF THE INVENTION

This invention relates to novel electrodeionization apparatus adapted to transfer ions in a liquid under the influence of an electrical field. More specifically, this invention relates to electrodeionization apparatus adapted to purify liquids containing large, highly hydrated or highly charged or weakly ionized species including silica, sulfate, calcium, heavy metals, and polar and ionized organics.

BACKGROUND OF THE INVENTION

The purification of a liquid by reducing the concentration of ions or molecules in the liquid has been an area of substantial technological interest. Many techniques have been used to purify and isolate liquids or to obtain concentrated pools of specific ions or molecules from a liquid mixture. Known processes include electrodialysis, liquid chromotography, membrane filtration, reverse osmosis, ion exchange and electrodeionization. As used herein, the term electrodeionization refers to the process wherein an ion exchange material such as an ion exchange resin is positioned between anionic and cationic diaphragms. In contrast, the term electrodialysis relates to such a process which does not utilize ion exchange materials positioned between the anionic and cationic diaphragms. Although electrodeionization is quite effective in removing ions from liquid, it has never been developed to the degree that it adequately removes certain molecules or complexes that are large, heavily hydrated, weakly ionized or highly charged.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depleting chamber through a series of anionic and cationic diaphragms into a second volume of liquid in a concentration chamber under the influence of an electrical potential which causes the preselected ions to travel in a predetermined direction. The volume of the liquid being treated is depleted of ions while the volume of the second liquid becomes enriched with the transferred ions and carries them in concentrated form. The second of these patents describes the use of macroporous beads formed of ion exchange resins as a filler material positioned between the anionic and cationic diaphragms. This ion exchange resin acts as a path for ion transfer and also serves as an increased conductivity bridge between the membranes for the movement of ions. These patents represent the primary structural framework and theory of electrodeionization as a technique.

Significantly improved electrodeionization systems have more recently been disclosed in U.S. Pat. No. 4,925,541 to Giuffrida et al. and U.S. Pat. No. 4,931,160 to Giuffrida, the teachings of both of which are incorporated herein in their entireties by reference. However, these systems still have the drawback of being unable to adequately remove certain molecules or complexes that are large, heavily hydrated, weakly ionized or highly charged.

The previous literature on technologies which rely on bipolar membranes and electroregeneration of resins does not discuss the role of membrane or resin crosslinking to any great extent. This probably is because it has been assumed that very high membrane permselectivities were required due to the large concentration gradient that occurs across the membranes during use. It also seems to have been assumed that, in the production of high purity water, (i.e. water that is both deionized and free of large or highly hydrated species), the transfer of ions was "film diffusion controlled" as in normal ion exchangers and therefore the diffusion rate of ions within the resin was unimportant. In film diffusion controlled systems, the controlling factor in transfer speed is the ability of ionic species to cross a "film boundary layer barrier" present at the interface between the resin and the liquid in which the ionic species resides.

The above assumptions have been strengthened by AC electrical resistance measurements of resins and membranes which show little difference in resistance in the presence of typical ions found in water. Thus, absolute resistance of components was considered of little importance because it related only to power consumption which is small for electrodeionization systems because they are used with high purity water applications having relatively low salinity as a starting point. Furthermore, electrodeionization was often used downstream of ion exchange softeners or scavengers which eliminates the need to remove large, highly hydrated or highly ionized species from feed streams using electrodeionization equipment. The drawbacks of electrodeionization systems resulted in the water treatment field developing relatively little interest in the removal of large, highly hydrated or highly charged species from feed water via electrodeionization.

The film diffusion model was strengthened in credibility when highly crosslinked resin beads having a substantially uniform diameter were substituted for conventional resins in electrodeionization apparatus. The use of such resins in electrodeionization apparatus is the subject of U.S. Pat. No. 5,154,809 to Orem, et al. This change resulted in improved performance due to an increase in the resin surface area and also due to an effective increase in the amount of resin active in the electrical circuit within the system.

The aforementioned problems with conventional electrodeionization apparatus can be exemplified using silica as a model. Compared with other dissolved materials commonly found in water, silica is present only in trace amounts. However, its removal becomes important in the production of high purity water; every trace constituent present in the feed water must be removed if the feed water is to be processed into a high purity form. It is well known that systems such as electrodialysis do not remove silica and that electrodeionization and electroregeneration techniques only partially remove silica. The inability to adequately remove silica from a feed water stream thus greatly reduces the applicability of the above techniques in high purity applications, including the largest high purity application, boiler feed water.

According to the "film diffusion" model discussed previously, silica is not well ionized and therefore does not transfer through the resin and membrane. However, such an assumption does not explain observations regarding performance of electrodeionization apparatus on silica removal. The change to resins having a substantially uniform bead diameter allowed complete removal of weakly ionized carbonic acid from the feed stream, but did little or nothing to help with removal of silica. However, when electrodeionization is operated at high voltage and/or low flow rates, silica can be picked up by the resin. As such, the silica must be in ionic form on the resin and must therefore have transferred successfully through the "film boundary layer barrier". Even in these cases, however, total transfer does not occur.

The literature has suggested pH adjustments of the water to a more basic form to ionize the silica and enhance its removal from feed water. However, such pH adjustments have been found to have only a moderate effect on silica removal. Instead of removing silica, the equipment rapidly removes the hydroxide ion that was added during pH adjustment and leaves the silica behind. Attempts to remove silica by bipolar electroregenration of resin have resulted in only partial removal as well.

Although exemplified by silica, many other trace constituents are not adequately or easily removed from feed water by electrodialysis, electrodeionization or bipolar/electroregeneration techniques. Some species diffuse so slowly or bind so tightly they use up available sites on the resin thereby reducing the capabilities of the resin to remove rapidly diffusing ions. The slow diffusing or binding species are referred to in the industry as "foulants". Although this problem is usually associated with anion resins, the problem is also known to occur in cation resins in the presence of multi valent cations.

Although also exemplified by silica, many constituents, particularly organic acids but also constituents like boron, have difficulty being removed from feed water because they are only weakly ionized. In this case, external means can be used to adjust the pH in order to provide higher ionization of the compounds. However, with existing devices using highly crosslinked resins, this proves to be an inefficient process because the ions to be removed still transfer more slowly than the added hydrogen and hydroxide ions needed to effect the ionization of the impurity. This condition results in excess electrical requirements or chemical feed rates.

In the case of silica, present electrodeionization devices operated under standard conditions are unable to remove more than about 80% silica under any conditions of voltage or current. As used herein, the term standard conditions for silica removal signifies a 13 inch flow path, nominal diluting and concentrating stream flow velocities, 5°-35° C., non polarity reversal, pH below 9 in the concentrating stream (either directly or via transport of hydroxide ions via the dilute stream), no addition of ionizing chemicals, no AC overlay, at least 1 ppm dissolved silica in the feed stream and steady state operation.

Sulfate removal using standard conditions has a limit of approximately 66%. For purposes herein, the term standard conditions for sulfate removal signifies a 26 inch flow path, single stage, 100 inch effective membrane area per cell pair, flow rate of 200 ml/(minute cell pair), 67-80% product water recovery, 15°-25° C., non polarity reversal, no AC overlay, steady state operation, approximately neutral pH and a feed stream containing a pure sodium sulfate solution of 250 ppm concentration. The equipment is operated at an applied voltage which provides electric current passage of about 1.25 amperes.

Under steady state conditions, present electrodeionization apparatus is also unable to remove highly charged (i.e. trivalent or greater) ions. For cell designs to date, voltage increases that effectively double the electric current across the cell have been sufficient only to increase the removal of highly charged ions by a factor of no more than about 25% of the incoming feed level.

Finally, present electrodeionization devices are unable to efficiently remove, under steady state conditions, large ions (i.e., ions having equivalent weights of greater than about 200). For present cell designs, voltage increases that effectively double the electric current across the cell have been sufficient only to increase the removal of such large ions by a factor of no more than about 25% of the incoming feed level.

The inability to completely remove silica, organics and certain metal ions and the increase in fouling sensitivity greatly reduces the applicability of electrodeionization and other processes in numerous water treatment applications. Therefore, as currently used, electrodeionization systems often require extensive pretreatment steps such as softening, organic scavenging, UV destruction of organics or reverse osmosis. They also often require post treatments such as ion exchange polishing. Additionally, in feeds containing mixed ions, electrodeionization cannot operate at maximum efficiency for high purity water production. These disadvantages increase the costs and complexity of a high purity treatment system thereby decreasing the competitiveness of the process over traditional techniques like ion exchange and reverse osmosis. The disadvantages also decrease the applicability of electrodeionization processes for water purification applications such as water softening, trace component polishing, electroplating, chemical synthesis and purification, food and beverage processing and waste treatment applications.

SUMMARY OF THE INVENTION

The present invention provides methods and devices for improved separation efficiency in electrodeionization procedures, and is particularly useful for producing water having a reduced content of large and highly hydrated species, highly charged species or species which are only weakly ionized at approximately neutral pH. The invention is particularly well suited for removal of constituents such as silica from feed water streams thereby allowing electrodeionization apparatus to be used in the production of high purity water for numerous applications, including boiler feed water.

According to one aspect of the invention, the relative transfer of an ion to be moved across a membrane or resin is enhanced relative to hydrogen and hydroxide ions by lowering the resistance of the membrane or the resin to the ion. In connection with electrodeionization processes, the device includes a membrane or resin having a conductance whereby a substantial increase in either voltage or pH is capable of causing a substantial increase in the transfer of the highly charged or large and highly hydrated ions across the membrane. Such a conductance may be achieved by the use of a low crosslinked ion exchange membrane or a low crosslinked ion exchange resin in at least one compartment of an electrodeionization apparatus. Such membranes or resins have a greater interstitial water content, a greater pore size and a decreased charge density as compared to membranes and resins having higher degrees of crosslinking.

As used herein, low crosslinked anion exchange resins are defined as having less than about 6% crosslinking, and low crosslinked cation exchange resins are defined as having less than about 8% crosslinking. For ionic species which are subject to particle diffusion models for transfer through ion exchange resins, the above effects enhance transfer through the resin by reducing the number of physical barriers to a species diffusing through the resin and by reducing the likelihood of electrical binding of the species to the resin as well.

In one embodiment, the resin may be a Type I anion resin crosslinked less than 6% and having a moisture content of at least 50%. Likewise, the membrane may be fabricated from such a resin. The use of such materials in electrodeionization apparatus has been found to result in a system that is capable of reducing the content of silica in a process water stream to less than 50 parts per billion, and in some cases, even less than 5 parts per billion. The device also may include alternatively or in addition a cation material, crosslinked at less than 8%. This permits enhanced removal of species such as calcium. The device further may include alternatively or in addition a compartment or membrane containing a Type II resin, crosslinked at 6% or less. This permits enhanced removal of sulfate.

According to another aspect of the invention, electrodeionization processes are improved by applying conditions to decrease the overall electrical resistance to movement of a species. This may be achieved by conducting the deionization process under conditions of high pH (i.e. pH greater than 9.5) in the concentrate stream or under conditions of a high velocity (i.e. velocity at least 3 times nominal velocity) in the concentrate stream. The results further may be improved by applying an AC overlay under conditions of either high concentrate velocity or high concentrate pH.

The apparatus and processes of the invention permit enhanced removal of large or highly hydrated species and also of highly charged or weakly ionized species in electrodeionization procedures. As set forth herein, large ions are intended to be ions having an equivalent weight greater than about 200, highly hydrated ions are intended to be ions having a hydration number of at least twice that of potassium or chloride ions, highly charged ions are intended to be ions having a valence of at least three, and weakly ionized ions are intended to be ions having a dissociation constant of greater than $+3.0$ based on $pK_a$ or a dissociation constant of less than $+11.0$ based on $pK_b$.

The invention also reduces membrane fouling, permits differential removal of certain species by adjusting pH, and overall permits more efficient separation in electrodeionization procedures, whether such procedures are used for purification or separation.

Accordingly, it is one object of this invention to combine the use of specialized ion exchange resins and membranes to improve the performance of electrodeionization apparatus and processes.

Another object of the invention is to enhance the removal of large or highly hydrated ions from feed water using electrodeionization.

Another object of the invention is to enhance the removal of species which are only weakly ionized at approximately neutral pH from feed water using electrodeionization.

Another object of the invention is to reduce the level of fouling in electrodeionization apparatus caused by slow diffusing molecules such as polar or ionized organics or high valence ions such as heavy metal ions or phosphates.

Another object of the invention is to enhance removal of polar and ionized organics and heavy metals from feed water using electrodeionization.

Another object of the invention is to enhance the electrical conductivity of anion resin versus cation resin to allow a higher cation to anion resin ratio for optimum electrodeionization performance.

Another object of the invention is to improve the transfer efficiency of impurity ions relative to that of hydrogen and hydroxide ions so as to allow enhanced transfer of the impurity ions.

Another object of the invention is to allow the use of electrodeionization apparatus for specialized chemical purifications, fractionations and syntheses that rely on different diffusion rates in low and high crosslinked resins.

Another object of the invention is to allow operation of electrodeionization apparatus on certain wastes and/or recycle streams.

Yet another object of the invention is to provide a means for removing silica from feed water to a level of less than about 5–50 parts per billion to allow electrodeionized process water to be used in boiler feed applications.

DETAILED DESCRIPTION OF THE INVENTION

The device described below is substantially the same in overall construction to that described in U.S. Pat. No. 4,931,160. The invention herein, however, relates to the composition of the membranes and resins in that device and improved methods of operation of that device.

An electrodeionization apparatus is provided wherein each electrodeionization electrical stage includes an anode, a cathode and their compartments, a series of concentration compartments and a series of depletion compartments that contain an ion exchange material such as a mixture of anion exchange resin and cation exchange resin. The depletion compartments are provided with inlet and outlet means so that water to be purified is passed through at least one depletion compartment between a given anode and cathode pair in each stage. Improved ion removal efficiency can be attained with the multiple pass process described in U.S. Pat. No. 4,931,160 to Giuffrida.

The depletion compartments are formed so that the ion exchange resin mixture is housed within independent discrete subcompartments each of which has a width of about four inches or less, preferably between about 0.5 and about 1.5 inches. The discrete subcompartments are formed by securing, such as by bonding, both the anion permeable membrane and the cation permeable membrane to the periphery of the depletion compartment and to ribs which extend across the thickness of and along the entire length of the depletion compartments so that the walls of each subcompartment are defined by a pair of opposed ribs, with the anion permeable exchange membrane and the cation permeable membrane forming an opposed floor and ceiling of the subcompartment. Solid ion exchange materials are positioned within the subcompartments and are constrained from moving between subcompartments by the ribs and ion permeable membranes. Representative suitable solid ion exchange materials include fibers or beads or the like. When employing ion exchange beads, typical bead diameter is about 0.04 inches or less, preferably between about 0.033 and about 0.012 inches in diameter (20 to 50 mesh).

The electrodeionization apparatus can comprise one or a plurality of stages. In each stage, an anode is positioned at an opposite end of a stack of depleting and concentrating compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentrating compartments constructed as set forth herein. The liquid to be depleted of ions can be passed in parallel through each depleting compartment in each stage in order to effect removal of ions from the first liquid in the depletion compartments into the second liquid in the concentrating compartments. The direction of flow within the depletion compartments is not critical and can be in the same direction or in an opposite direction to the flow in an adjacent compartment or concentration compartment. When a plurality of stages are utilized, the liquid removed for the depleting compartments in an upstream stage can be directed in series into the depleting compartments in the next adjacent downstream stage. Alternatively, feed water can be directed in a counter flow arrangement in depleting compartments comprising a second stage. Electrolyte can be passed through the spacer adjacent each electrode in the electrodeionization apparatus and is removed from the electrodeionization apparatus.

It is important that the subcompartment in the depleting compartments have a controlled thickness and width in order to sustain high efficiency for ion depletion over long periods. The thickness of the subcompartment should be between about 0.25 and about 0.05 inches, preferably between about 0.06 and 0.125 inches. The width of the subcompartment should be between about 0.3 and 4 inches, preferably between about 0.5 and about 1.5 inches. There is no limit on the length of the compartment other than as dictated by practical construction and fluid pressure loss considerations.

Obviously, the longer the subcompartment length, the greater the ion removal from the liquid therein. Generally, the length of the subcompartments is between about 5 inches and about 70 inches. The subcompartments can contain 100% anion exchange material, 100% cation exchange material or a mixture of the two.

When it is desired to remove only a particular anion or particular cation, 100% of the appropriate ion exchange material is used. Usually, it is desired to remove both cations and anions in order to produce a purified liquid product. The preferred compositions will be described in greater detail below.

When utilizing strong acid-base resin materials such as beads, the ratio of anion exchange resin beads to cation exchange resin beads used in prior art electrodeionization systems is about 70% to 30% by volume. In the current invention, however, this ratio can be altered to provide a greater relative amount of cation exchange resin. In electrodeionization theory, it is well known that for every cation moved, there must be a corresponding movement of an anion. However, since in conventional ion exchange resins, diffusion through anion exchange resins is slower than diffusion through cation exchange resins, conventional systems have packed in larger amounts of anion exchange resins to enhance transfer. If, as in the present invention, the selectivity of the resin is reduced by for example the employment of a lower crosslinked resin, the ionic species from the depleting stream will transfer across the resin at a faster rate. Accordingly, the requirement to pack in large amounts of anion exchange resin is eliminated, thereby allowing a greater amount of cation exchange resin to be employed in the same volume, resulting in improved system dynamics.

By utilizing the subcompartment structure in the depleting compartments, efficient mixing of the liquid and the beads therein is attained while avoiding channeling of the liquid through the depleting compartments. This structure further avoids problems which can result from compaction or movement of the beads within a portion of the volume of the depleting compartment. Thus, efficient exchange between the ions in the liquid in the depleting compartment and the ions in the beads to effect ion removal from the depleting compartment liquid is attained. Furthermore, it has been found that by controlling the geometry of the subcompartment as set forth herein and by the use of multiple depletion compartments in each : stage, relatively low energy requirements for the electrodeionization apparatus can be utilized, even over long periods, to attain desired liquid purity.

Figure 1:
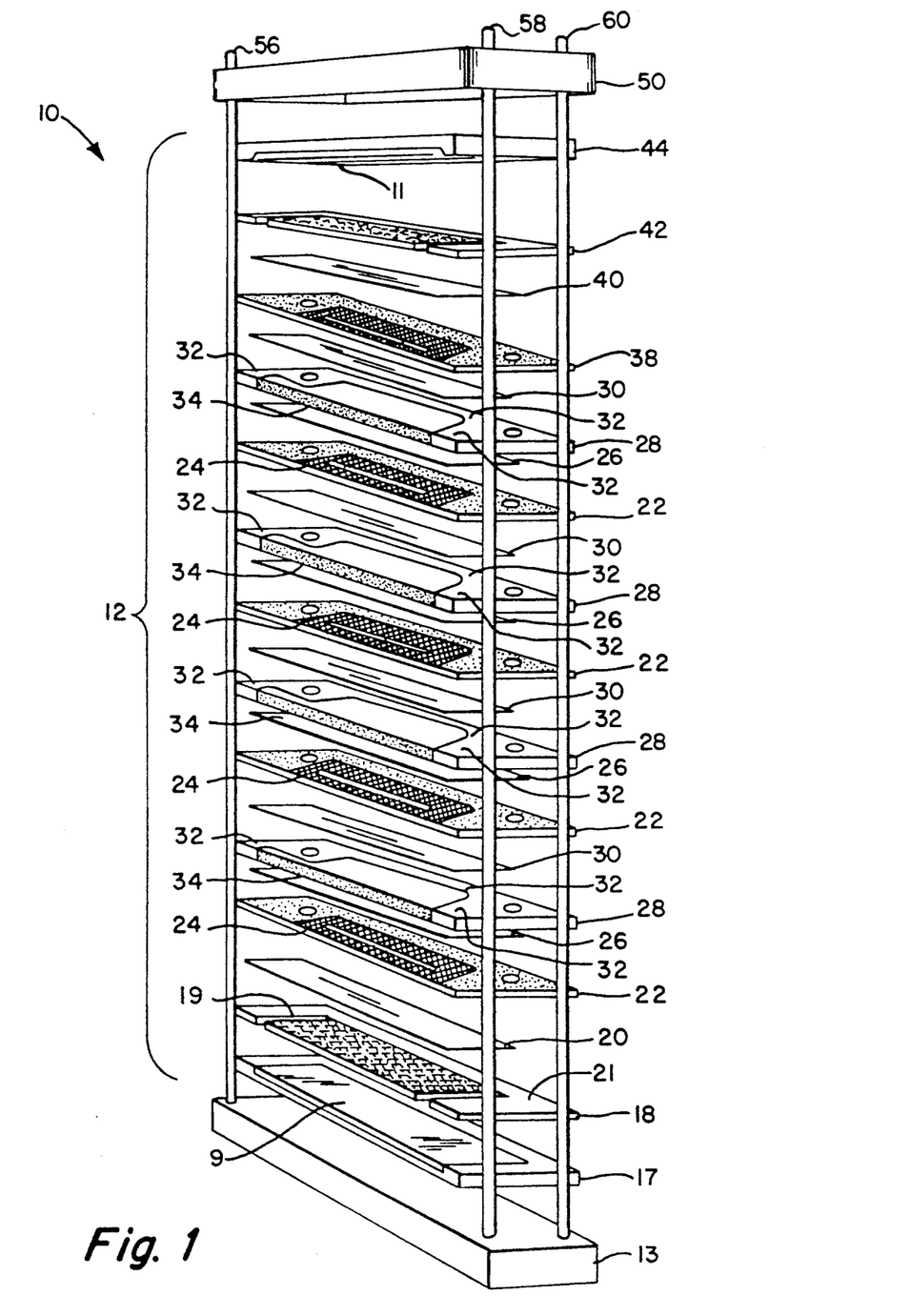
FIG. 1 is an exploded view of an electrodeionization apparatus of this invention.

Referring to FIG. 1, the electrodeionization apparatus 10 comprises one stage 12 bounded by electrode 9 and electrode 11. Adjacent an endplate 13 is an endblock 17 to house electrode 9 and provide desired manifolding. An electrode spacer 18 is positioned adjacent to the end block 17 and includes a screen 19 which effects turbulent flow of liquid passing through the electrode spacer 18. An ion permeable membrane 20 is sealed to the periphery 21 of electrode spacer 18. Spacers 22 formed of flexible material include a screen 24. The spacers and screen 24 comprise the concentrating compartments of the electrodeionization apparatus of this invention. The depleting compartment structures of this invention comprise an ion permeable membrane 26, a spacer formed of rigid material 28 and an ion permeable membrane 30. The ion permeable membranes 26 and 30 are sealed to the periphery 32 of the spacer 28 on opposite surfaces of the spacer 28. Mixed ion exchange resin beads 34 are housed within a central space which includes ribs (not shown) and are retained therein by the membranes 26 and 30. Liquid to be purified within stage 12 is passed through at least one unit comprising spacers 22 and 28 and membranes 26 and 30. The units which comprise spacers 22 and 28 and membranes 26 and 30 are repeated usually between about 5 and 100 times in order to provide reasonable liquid flow-through capacity in stage 12. A spacer 38 formed of flexible material and screen 24 plus an ion exchange membrane 40 form the end concentrating compartment. An electrode spacer 42 is positioned adjacent the end block 44 housing electrode 11. End plate 50 is positioned adjacent the end block electrode assembly on the side opposite that adjacent to the electrode spacer 42. Bolts 56, 58 and 60 as well as a fourth bolt (not shown) extend along the entire length of the apparatus 10 to retain the apparatus elements in place.

Figure 2:
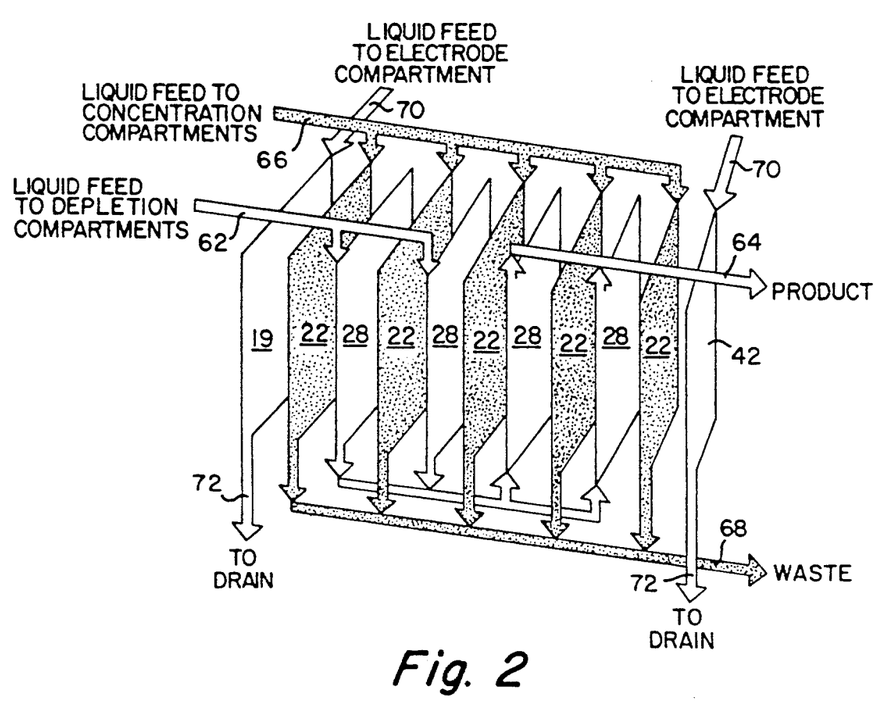
FIG. 2 is a schematic view illustrating the operation of the apparatus of this invention.

Referring to FIG. 2, the flowpaths of the liquids in the various compartments are explained. Shown is a two-stage device, although single or multiple stage devices can be used as well. Liquid to be purified enters inlet 62, passes through depletion compartments 28, is then passed through a second depletion compartment 28 and is recovered from outlet 64. It is to be understood that liquid flow through the depletion compartments can be in one direction in each stage. Also, the liquid can be made to flow through more than one depletion compartment in each stage. In addition, the liquid effluent from a depletion compartment can be split into multiple streams and then passed through a second set of depletion compartments. Concentrating liquid is passed through inlet 66 through concentrating compartments 22 and thence through outlet 68 to drain. Liquid electrolyte is circulated through electrode compartments 19 and 42 from inlets 70 and is discarded to drain through outlets 72.

Figure 3:
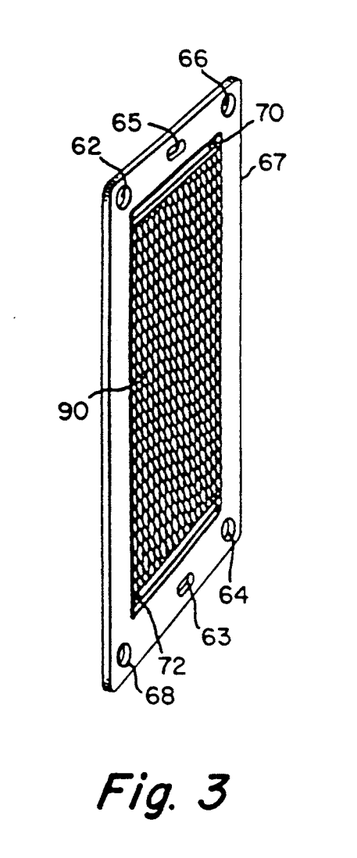
FIG. 3 is a depiction of a spacer construction positioned adjacent an electrode of the apparatus of this invention.

Referring to FIG. 3, the electrode spacer 67 includes electrolyte inlet 70 and electrolyte outlet 72 and a screen 90 for effecting turbulence of liquid passing therethrough.

Figure 4:
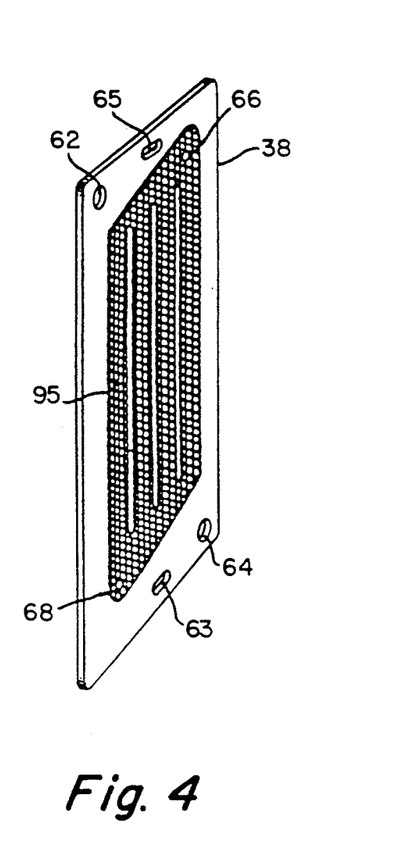
FIG. 4 is a depiction of a flexible spacer construction which includes the concentration chambers of the apparatus of this invention.

Referring to FIG. 4, the spacer formed of flexible material, e.g. spacer 38, includes a liquid inlet 66 and a liquid outlet 68 which provide liquid communication to the interior of spacer 38 in which is positioned a screen 95 in order to effect turbulent liquid flow. The outlet 64 permits passage of liquid into the adjacent depleting compartments and inlet 62 permits liquid removal from the adjacent depleting compartments without admixture of the purified liquid with the liquid in the concentrating compartment formed in spacer 38.

Figures 5, 6:
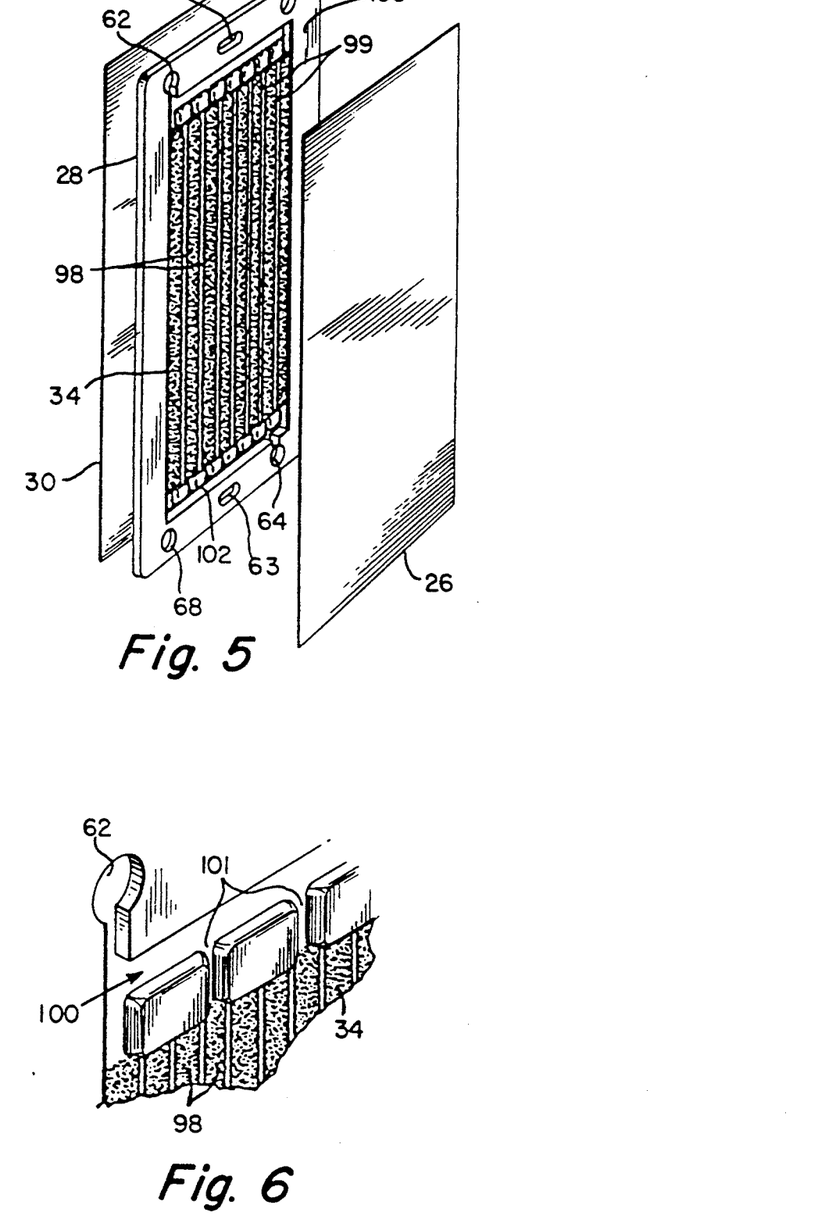
FIG. 5 is a depiction showing the depletion chambers of the apparatus of this invention.
FIG. 6 is a detailed view of the liquid inlet means to the structure of FIG. 5.

Referring to FIGS. 5 and 6, the structure of the depleting compartments of this invention is shown in detail. The depleting compartment comprises a rigid spacer, e.g. spacer 28, and an anion permeable membrane 30 and cation permeable membrane 26. One type of spacer useful in the present invention is the subject of U.S. Pat. No. 4,747,929, issued May 31, 1988, entitled, "Depletion Compartment and Spacer Construction for Electrodeionization Apparatus" the teachings of which are incorporated by reference herein. The ion exchange materials 34 are housed within subcompartments formed by the membranes 26 and 30, the wall 105 and the ribs 99. The membranes 26 and 30 are sealed along their entire length to wall 105 and ribs 99. The membranes 26 and 30 are also sealed to the periphery of the rigid spacer 28 so that the individual subcompartments 98 are effectively isolated from each other. Liquid to be purified enters inlets 101 and into the subcompartments 98 wherein it is subjected to an electrical voltage in order to pass anions through membrane 30 and cations through membrane 26. The purified liquid then passes through outlets 102 and spacer outlet 64 wherein it is collected in accordance with the explanation of FIG. 2.

In one aspect of this invention, the liquid to be purified can be pretreated prior to the electrodeionization stages to remove specific contaminants such as organics. A softener-scavenger system can be employed wherein the softener can include a cation exchange resin and/or an anion exchange resin to remove specific ions. The scavenger can comprise an anion exchange resin in order to remove foulants that foul the anion resin such as organics, including tannins, humic acids, fulvic acids and lignins. The ion exchange resins can be regenerated with brine (NaCl) efficiently and simply. It should be noted however, that the need for pretreatment stages can be significantly lessened by the use of lower crosslinked ion exchange resins and membranes according to the invention.

The present invention is also particularly well-suited for electrodeionization applications in which a scavenger is not used for example, in polarity-reversal systems such as those described in U.S. Pat. No. 4,956,071, issued Sep. 11, 1990 and entitled "Electrodeionization Apparatus and Module" the entire disclosure of which is incorporated by reference herein. Since polarity-reversal systems operate with high proportions of divalent impurity ion species, the advantages of the use of systems having the membrane/resin varieties described herein will act to further enhance the performance of such apparatus.

The improved performance by use of low crosslinked (for silica and multi-valent ions) or less selective (Type II) resin (for multi-valent "small" anions) relates in one aspect of the invention to the relative transfer of the ion to be removed as compared to either hydrogen or hydroxide ions.

Large, multi-valent, weakly ionized and highly hydrated ions (i.e. calcium, sulfate and silica ions) have difficulty transferring through highly crosslinked or highly selective resins and membranes. Therefore, in electrodeionization, the presence of these constituents causes the resins and membranes to exhibit a higher electrical resistance, thereby requiring a higher voltage gradient to move these constituents at an equivalent rate as smaller, less selective ions. Although this phenomenon would not appear to be detrimental to removal of these constituents, (since it would seem as though an obvious solution to the problem would be to raise the voltage across the module, thereby overcoming the increased electrical resistance), it has been found that for modules using high crosslinked or highly selective resins, raising the voltage has only a minimal effect on improved removal of these constituents. The reason for this is that at a voltage greater than about 3 volts in the cell, the diluting stream water splits into hydrogen and hydroxide ions. For highly crosslinked resins, the hydrogen and hydroxide ions are much more electrically conductive in the resins and membranes than these constituents. The result of this effect is that raising the voltage merely acts to transfer a greater amount of newly formed hydrogen and hydroxide ions rather than removing the desired constituents.

Surprisingly, it has been discovered that this effect is mitigated when using low crosslinked or low selectivity resins. This is because the conductance of the resins becomes more favorable for the constituents to be removed relative to the hydrogen or hydroxide ions. Therefore, in an electrodeionization device containing low crosslinked or low selectivity resins, the transfer of ions tends to favor the constituents to be removed rather than the products of water splitting.

Among the resins that can be used in connection with the present invention are the following:

Anion Resins

| Product | Approximate Crosslinking (%) | Diameter (um) | Moisture (%) | Ion Exchange Capacity (meq/ml) | Porosity Type |
|---|---|---|---|---|---|
| Dow 550A (Type I) | 6 | 520–620 | 44–55 | 1.1 | Gel |
| Purolite A-300 (Type II) | 6 | 300–850 | 40–45 | 1.5 | Gel |
| Purolite A-450 (Type I) | 4.5 | 300–850 | 48–57 | 1.3 | Porous |
| Mitsubishi PA306 (Type I) | 3 | 300–850 | 66–76 | 0.8 | Porous |
| Dow Dowex IX2 | 2 | 180–425 | 65–80 | 0.6 | Gel |

Cation Resins

| Product | Approximate Crosslinking (%) | Diameter (um) | Moisture (%) | Ion Exchange Capacity (meq/ml) | Porosity Type |
|---|---|---|---|---|---|
| Dow Dowex 650C | 8 | 600–700 | 46–51 | 1.9 | Gel |
| Dow Dowex XFS-43279 | 6 | 297–420 | 47–57 | 1.3 | Gel |
| Dow 50W-X4 | 4 | 300–850 | 57–67 | 0.6 | Gel |

The above resins generally comprise a polystyrene matrix crosslinked with divinyl benzene to which a variety of functional groups may be added. Type I resins contain $CH_2N(CH_3)_3Cl$ functionality, whereas Type II resins contain $CH_2NC_2H_4OH(CH_3)_2Cl$ functionality. The enhanced performance resulting from low crosslinked or low selectivity resins has been measured by measuring the DC conductance of the different resins in different ionic forms. The DC conductance was measured using the testing apparatus and method described below.

Since ion exchange resins are, by design, excellent conductors of electrical current, it is possible to measure the relative electrical resistance of various resins in different salt forms. Measurements can be carried out on both anion and cation exchange resins and the resins can be in a variety of forms including beads, membranes and fibers. Unlike conventional conductivity bridge methods, the method described herein utilizes an applied direct, rather than alternating, current.

The test method described herein is believed to measure the actual transfer of electric charge and not merely the resonance of ions. Unlike conductivity bridge methods that use alternating current, the present method is believed to provide a more accurate and realistic examination of electrical resistance in electrodeionization apparatus using ion exchange materials.

The DC conductance test was carried out as follows:

1. Samples of ion exchange material were conditioned into various ionic forms by contacting the samples with various salt solutions. These solutions comprise for example, 4–5% solutions of NaOH, HCl or NaCl. (For resin pretreatment to the silica form, the resin was first loaded to the hydroxide form followed by treatment with a sodium silicate solution). For single ionic form comparative resistance testing, the same lot of reagent salt solutions was used for each sample tested. All testing solutions were prepared in advance and allowed to reach room temperature prior to testing. Typical pretreatment and conditioning methods for ion exchange resins are well known in the art. For the purpose of these tests, the guidelines of Method D2187 of the American Society for Testing and Materials (ASTM) were followed.

2. Approximately 3 $cm^3$ of each resin sample was placed in a test cell. The cell comprised a clear plastic frame having an enclosed channel in which the resin was contained. The channel was approximately 4.5 inches high, 0.5 inches wide and 0.08 inches deep. The top and bottom portions of the channel were connected to a fluid source to allow fluid flow through the resin to rinse it prior to testing. An opposed pair of platinized platinum electrodes were positioned on opposite sides of the resin channel such that the resin channel was positioned between them. The electrodes were connected to a source of direct current.

3. Once conditioned, each resin sample was rinsed using 0.5 to 1.0 L of ASTM Type I reagent grade water. Type I water has a specific conductance of approximately 0.06 umhos/cm, a specific resistance of approximately 16.6M permanganate reduction time of approximately 60 minutes. The rinse step ensured that residual salts were removed from the resins thereby eliminating the possibility that such salts could interfere with the resistance measurements of the resins.

4. Once the cell, loaded with resin was rinsed, a small DC voltage was applied across the electrodes. The current was set at a constant value (approximately 0.100 amps) and the resulting voltage was measured directly. In each case, the test apparatus used a variable voltage power supply having capacitance filtering that reduced voltage ripple to less than 1%.

5. Since the current and voltage were known or measured for a given resin, the relative resistance was easily determined using Ohm's Law in which the resistance is equal to the voltage divided by the current.

It is pointed out that this DC conductance test is inherently transient since, when current is passed through the ion exchange resin contained in the channel, water is split, thereby adding hydrogen and hydroxide ions to the testing solution. Since such water splitting causes the hydrogen and hydroxide ion concentrations to increase, (and interfere with resistance measurement of the resins), the resistance measurements are taken quickly after the current is initially applied. Additionally, separate or reconditioned resin samples are needed for each applied current value to avoid interference from water splitting resulting from prior runs.

The following chart shows relative electrical resistance at 0.100 Amps applied current:

| Resin Type | Resin Form | Relative Resistance in The Form listed |
|---|---|---|
| Type I Anion 4% crosslinked (Purolite A-400) | Hydroxide | 1 |
| | Silica | 1.88 |
| | Sulfate | 0.91 |
| | Chloride | 0.86 |
| Type I Anion 4.5% crosslinked | Hydroxide | 1 |
| | Silica | 3.641 |

| Resin Type | Resin Form | Relative Resistance in The Form listed |
|---|---|---|
| (Purolite A 450) | Sulfate | 1.10 |
|  | Chloride | 0.93 |
| Type I Anion | Hydroxide | 1 |
| 6% crosslinked | Silica | BDL[2] |
| (Dow 550A) | Sulfate | 2.35 |
|  | Chloride | 2.28 |
| Type II Anion | Hydroxide | 1 |
| 6% crosslinked | Silica | BDL[2] |
| (Purolite A-300) | Sulfate | 1.09 |
|  | Chloride | 0.89 |
| Cation | Hydrogen | 1 |
| 4% crosslinked | Calcium | 1.53 |
| (Purolite C-450) | Sodium | 1.31 |
| Cation | Hydrogen | 1 |
| 6% crosslinked | Calcium | 1.76 |
| (Dow XFS 43279) | Sodium | 1.44 |
| Cation | Hydrogen | 1 |
| 8% crosslinked | Calcium | 2.13 |
| (Dow 650C) | Sodium | 1.52 |

As shown in the chart, in the case of anion resins, a lower crosslinkage favors conductance of the constituent ions relative to hydroxide. In fact, below about 4%–6% crosslinkage, chloride and sulfate are actually more likely to transfer than hydroxide. Going from 4%–6% to 3%–4% crosslinking in the resin makes silica more than twice as favorable to transfer relative to hydroxide. The silica transfer of the 6%–8% crosslinked resin was below detection limits,

[1] Relative resistance in the silica form for the 4.5% crosslinked, Type I anion exchange resin was extrapolated from data measured at lower current density.
[2] Values labeled "BDL" represent values below detection limits, probably because hydroxide transfer was so much more favorable. It is pointed out that although the DC conductance tests have been carried out only upon resins, membranes fabricated from such resins are expected to perform in a similar manner.

An additional side benefit to the use of low crosslinked or low selectivity resins is that their absolute conductance is also improved. Therefore, for a given amount of electrical current passage across, for example, a 4% crosslinked anion exchange the power consumption is lowered by about 50%. This value will vary as resin type and crosslinking is varied.

High velocity and/or high pH in the concentrate stream, can be used to further enhance removal of constituents of concern. Additionally, performance enhancement has been found with the use of AC overlays. In all cases, the process changes are believed to have the effect of more quickly releasing the constituent (e.g., silica) into the concentrating stream after it has passed through the resin and membrane. High velocity is believed to improve the mass transfer rates between the concentrate side of the membrane and the bulk concentrate solution thereby improving silica transfer. High pH is believed to maintain silica in the ionized form as it passes from the membrane into the concentrate stream. High pH does not appear to be necessary in the diluting stream, since electroregeneration of the resins appears to maintain them in the hydroxide form regardless of the bulk pH of the stream. If the concentrate stream is at high pH, high velocity does not seem to be as important, perhaps because release of silica occurs ionically as well as by diffusion. The use of an AC overlay according to the invention tends to improve diffusion of constituents such as silica at boundary layers and also tends to favor conductance of constituents of concern relative to hydrogen and hydroxide ions at high velocity and/or high pH conditions.

In addition to the above, further process enhancement can be achieved by substituting a bed of ion exchange resin for the screen in the concentrating compartment. Thus, the resulting device includes at least one concentrating compartment comprising an ion exchange resin bed positioned between an anion exchange membrane and a cation exchange membrane. As in the case of the depleting compartments, the resin filled concentrating compartment can include 100% anion exchange resin, 100% cation exchange resin or a mixture of such resins. Furthermore, the particular ratio of anion to cation resin selected for the resin bed of the concentrating compartment can be the same as or different than the resin ratios of the adjacent depleting compartments. The use of a concentrating compartment filled with an ion exchange resin bed has been found to improve ionic conductance, thereby enhancing removal of silica and like impurities.

Still further process enhancement can be achieved, in certain circumstances, by operating the apparatus under conditions in which the pressure within the concentrating compartments is elevated. In particular, in some applications, gasses such as $CO_2$ are formed in the concentrating stream. If these gasses are present at a concentration above that which can be readily dissolved by the process stream, they do not remain in solution, but rather, bubble out. Although this does not threaten the equipment or process, the gas bubbles, having a higher electrical resistance than the surrounding solution, add to the overall electrical resistance across the compartment. As noted above, however, removal of impurities such as silica from a process stream is enhanced by an increase in ionic conductance (which corresponds to a decrease in electrical resistance).

The elimination of gas bubbles in the concentrating compartments results in decreased electrical resistance and improved removal of impurities. Fortunately, the bubbles can be prevented simply by operating the equipment under conditions which provide elevated pressures in the concentrating compartments. Such conditions can be readily achieved by numerous methods, including increasing the flow rate in the compartments or by causing a restriction at the fluid outlet of the compartments. It is preferred that the pressure be elevated to level sufficiently high to maintain substantially all dissolved gasses in solution, thereby preventing bubble formation and maintaining electrical resistance at a minimum.

The above process improvements tend to enhance device performance, both in terms of overall purification levels and in decreasing device electrical resistance.

In view of the foregoing, ion exchange resins having a lower degree of crosslinking than those which have previously been utilized in electrodeionization apparatus are used herein. Unlike conventional systems which use a conventional or highly crosslinked cation resin having between about 8% and about 10% crosslinking, and a moisture content of about 45%, the present system uses a cation exchange resin having between about 2% and about 6% crosslinking, and a moisture content between about 50% and about 70%. Similarly, whereas conventional systems use a conventional or highly crosslinked anion exchange resin having between about 6% and about 8% crosslinking and a moisture content of about 45%, the anion exchange resins used in the present system have : between about 1.5% and about 4% crosslinking and have a moisture content of between about 50% and about 80%.

By employing ion exchange resins having lower crosslinking than those resins used previously, the present system allows the removal of large, highly hydrated or heavily charged species such as silica, sulfate, calcium, heavy metal ions and polar and ionized organics to be greatly enhanced over systems presently in use.

Although not wishing to be bound by any theory of the invention, it is believed that factors other than film barrier diffusion are controlling for the above-mentioned species. As the degree of crosslinking in a membrane or resin is reduced, the interstitial water content of the resin will increase and the internal charge density of the resin will decrease. An increase in the interstitial water content corresponds to an increase in the molecular porosity of the resin, and a physical barrier effect preventing movement of constituents through the membrane or resin may be decreased. The decrease in charge density, on the other hand, decreases the likelihood that ions passing through the resin will be electrically bound thereto.

Additionally, an increase in the macroporosity of the resin tends to provide enhanced performance. This effect is believed to be due to the increased resin surface area that results when the resin is made more porous.

According to the invention, low crosslinking can be combined with resins having lower selectivity, i.e. the so called "Type II" resins. Surprisingly, by providing decreased selectivity with reduced crosslinking, the Type II resins have been found to be particularly effective for removal of highly charged species such as sulfate from feed water streams. In contrast, conventional (Type I) resins generally have selectivity that is too high to allow easy transfer of such highly charged species.

The low crosslinked ion exchange resins can be either a heterogeneous mixture of anion exchange resin and cation exchange resin, or in the alternative, can exist as separate resin layers or zones within the depletion chambers of the apparatus. Additionally, depending upon the types of constituents to be removed from the feed water, the low crosslinked resins can be used in combination with more conventional, highly crosslinked resins. In this case, high and low crosslinked resin can be contained in separate depletion compartments or they can be maintained in separate electrodeionization stages.

If both high and low crosslinked resins are to be used together, and the possibility of chemical attack exists, it is preferred that the more highly crosslinked resins be located upstream of the resins having lower crosslinking because lower crosslinking resins are more susceptible to chemical damage. Thus, by placing the more highly crosslinked resins upstream, these resins can serve to remove constituents from the feed water before the process stream contacts the lower crosslinked resins, thereby serving to protect the lower crosslinked resins from chemical attack.

Alternatively, if the possibility of fouling exists, it would be preferable to put the resins having lower crosslinking upstream in order to remove the foulants from the feed water before the process stream contacts the higher crosslinked resins, thereby serving to protect the higher crosslinked resins from fouling.

The ion exchange membranes used in the electrodeionization apparatus of the present invention will also contain low crosslinked resins so that movement of ions and polar compounds through the membrane is similar to the movement of those constituents through the resin beds.

The membranes of the apparatus of the present invention can be of either the heterogeneous or the homogeneous variety. Heterogeneous membranes are manufactured using a casting process in which a suspension of small particles of ion exchange resin are combined with a binder. Such membranes will generally have a crosslinking and water content approximating that of the resin from which the membrane is made. In contrast, homogeneous membranes are manufactured using a more direct process in which polymerization and crosslinking occur during membrane formation. Such membranes tend to have a much higher crosslinking as compared to heterogeneous membranes for a given water content. Thus, for a membrane containing a resin having a water content of between about 30% and 75%, a homogeneous membrane will have a crosslinking of between about 45% and 30%, whereas a heterogeneous membrane having a similar water content will have a crosslinking of only about 8% to about 2%.

The membranes of the present invention can comprise either an anion exchange resin, a cation exchange resin or a combination thereof. Membranes comprising such combinations of resins are referred to in the art as neutral membranes. The neutral membranes are useful in the present invention, particularly for applications in which the apparatus is to be operated in the transport depletion mode.

Unlike continuous electrodeionization apparatus in which scaling can become a problem, transport depletion methods can significantly reduce scaling tendencies within the apparatus. In conventional electrodeionization modes, anion and cation transfer occurs by electric current. Ions are attracted to oppositely charged functional groups on the ion exchange resins and are subsequently transferred by the resins through ion exchange membranes and into the concentrating streams. Under conditions of low flow, low salinity and high voltage, the resins are also continuously regenerated by hydrogen and hydroxyl ions, (the products of water splitting), thereby allowing a continuous stream of purified water in the diluting stream. Although the water splitting byproducts are desirable since they allow the resins to constantly accept undesirable ions, in the case of hard water, calcium and magnesium can deposit out of solution, thereby causing solid scaling.

This problem can be reduced or eliminated by operating a modified apparatus in the "transport depletion mode" in which only the calcium and magnesium (hardness) ions are concentrated in the concentrating stream. The apparatus differs from conventional electrodeionization apparatus by replacing an anion exchange membrane with a neutral membrane and by filling the apparatus with a low crosslinked cation exchange resin. This apparatus allows calcium and magnesium ions to pass through the membrane as in a conventional system.

As set forth above, neutral membranes can be constructed of a mixture of lower crosslinked anion exchange resin and standard crosslinked cation exchange resin. At the proper resin ratio, small or weakly charged anions and cations are allowed to pass through the membrane while hardness ions are partially excluded by resin having high affinity for the hardness ions.

By using low crosslinked resin in the resin bead mixture and cation membranes, transfer of hardness ions is enhanced and water splitting is reduced since there is a much lower resistance to transfer as compared to standard crosslinked resins and membranes. When high crosslinked cation resins are used in combination with anion resins to form the neutral membrane, transfer of small ions in both directions preferentially occurs. This gives rise to a situation in which diluting compartment water splitting is again reduced since the diluting stream hardness is partially replaced by sodium ions and the diluting compartment never becomes pure enough to cause significant water splitting.

By proper selection of resin and membrane combinations, a similar method can be used to effect separation of highly charged and/or large anions or cations.

Increased transfer rates can be achieved with other removal techniques, alone or on combination with low crosslinked resins. Various improved processes involving AC overlays, pH adjustment and concentrate velocity have been discovered, and are described in greater detail below in the examples. In addition, improved results may be obtained as with conventional processes, including the use of constant bead-sized resins, upstream ultraviolet destruction of organics and polarity reversal techniques.

Although the use of ion exchange resins having lower crosslinking provides electrodeionization apparatus with a number of advantages as discussed above, it must be recognized that resins having a lower degree of crosslinking do display some disadvantages. However, by properly understanding the limitations of lower crosslinked resins, electrodeionization apparatus can be designed to minimize the effects of the disadvantages and to largely avoid any problems associated therewith.

Among the disadvantages of lower crosslinked resins is that such resins generally have a lower strength than resins having higher crosslinking. For chemical regeneration type ion exchange, this lower resin strength is a serious drawback, however, for electrodeionization and related technologies, movement of the resin is not required and thus, mechanical strength does not become an issue.

Lower crosslinked resins also have a tendency to expand and contract more than resins having higher crosslinking. Although this is an important issue in the design of electrodeionization equipment, the effects of this dimensional change can be easily controlled by compartment geometry.

Lower crosslinked resins are also less resistant to chemical attack. This is a significant drawback in the treatment of feed water containing oxidants. However, for systems as described previously which use both high crosslinked and low crosslinked resins with the high crosslinked resins upstream of the low crosslinked resins, chemical attack does not become a significant issue.

An additional observation is that membranes which use lower crosslinked ion exchange resins are less permselective. For most applications, this does not become a significant problem because the membranes are still sufficiently permselective to provide desired performance. For certain food, chemical and recycle applications, however, the lower permselectivity of membranes using low crosslinked resins could become an issue. In that case, low crosslinked resins can be used with higher crosslinked membranes thereby avoiding problems with membrane permselectivity. Furthermore, depending upon the species to be removed, a low crosslinked anion resin and membrane could be used with a high crosslinked cation resin and membrane, for example, to thereby provide increased permselectivity for cationic species if such properties are desired.

Finally, lower crosslinked resins are known to have lower selectivity. This property turns out to be an advantage, because unlike batch ion exchange systems, equilibrium concentrations of process waters do not become an important consideration because ions are being continuously removed from the system. Rather, transfer rates become more important and these are enhanced by the lower selectivity of the resins.

At present, most electrodeionization units are operated in the "constant voltage mode" in which the power supply to the unit will increase or decrease electrical current loads to maintain a constant voltage as fluctuations in feed water resistance occur. While such operation may serve to optimize the electrical current requirements for the device, and therefore allow the device to be operated in the most electrically efficient manner, such a mode of operation can cause undesired effects when the contaminant concentration in the input process stream decreases.

As stated previously, in the case boiler feed water, it is often necessary to remove silica from the input process stream. It has been found that improvements to the quality of the input process stream, (i.e., higher resistivity as a result of a lower contaminant concentration), can surprisingly result in a dramatic decrease in the quality of the product stream. Although not wishing to be bound by any theory, it is believed that when the conductivity of the process stream decreases significantly, the power supply of a conventional electrodeionization apparatus compensates with a significant drop in electrical current output in order to maintain a constant voltage drop across the device. This current drop allows silica to be released from the ion exchange resins. (a condition commonly referred to as a "silica spike"), and thereby results in an unacceptable silica level in the product stream. The concentration of silica in the product stream as a result of a silica spike often takes an extended period of time to return to acceptable levels.

In contrast, if the apparatus is operated in the "constant current mode", the possibility of silica spikes is removed with only a minor loss of electrical current efficiency. In particular, the present electrodeionization apparatus can be run with its power supply set to deliver a constant electrical current level, the level being that at which the device would normally be operated for its worst case, low purity process stream. In other words, the device can be operated at the current levels that are used for an inlet process stream having the highest likely conductivity or the highest expected concentration of impurities. Since the apparatus is maintained in a constant current mode, if the contaminant concentration in the inlet process stream decreases, there will be no current drop and no silica spike will be created.

The trade-off for constant current mode operation is that when the quality of the input process water is better than anticipated, the apparatus will use more current than needed, thereby resulting in some degree of unnecessary water splitting. The only undesirable effect of such water splitting is a small waste of electrical current. Compared to the significant problems associated with silica spikes, (i.e., the effective loss of a process stream until impurity concentration returns to desirable levels), the small amount of energy that is potentially wasted by constant current mode operation can be ignored It is noted that the present invention is in no way intended to be limited to apparatus comprising solely the individual stages and configurations described herein. Rather, the invention can be used either alone or in combination with any number of other liquid purification or separation systems or methods known to the art.

For example, the present invention can be used in combination with UV radiation sources to destroy organic species either upstream or downstream of the inventive apparatus. Use of the present invention in combination with reverse osmosis equipment is contemplated as well. This combination is believed to be particularly desirable since silica removal is enhanced once bulk NaCl and colloidal silica have been removed from the feed stream and reverse osmosis equipment can be used to accomplish such removal. Additionally, the present invention is well suited for use as a pretreatment stage for an ion exchange polishing cartridge since such polishing cartridges tend to have longer lifetimes when used with cleaner feeds, or for use in a liquid treatment system utilizing polarity reversal techniques, such as those described in U.S. Pat. No. 4,956,071, set forth previously. Furthermore, the present invention is contemplated for use as at least one stage of a multi stage electrodeionization stack wherein at least one stage of the stack comprises a conventional electrodeionization stage.

EXAMPLES

The following examples are intended only to illustrate the present invention without limitation.

In the first example, the variables for silica removal per unit membrane area include anion resin type, anion membrane type, velocity of concentrate stream, pH of concentrate stream, and presence of an AC overlay. Other parameters including but not limited to applied voltage, temperature, ionic composition, dilute flow, and silica concentration can also affect the test results, but these were not varied in the tests. Silica removal rate has been shown to improve as temperature and silica concentration increase, and as ionic concentration and dilute flow decrease. These effects are similar to all other typical ionic contaminants, and are therefore not unexpected results.

EXAMPLE 1: Silica Removal

This example illustrates the improved separation efficiency obtained with the electrodeionization apparatus of this invention utilizing low crosslinked anion exchange components, high concentrate velocity and/or pH, and the presence of an AC overlay.

Test Conditions

All tests used about 5 volts DC per cell pair. This voltage was applied with variable power supplies filtered to less than 1% ripple. In all cases voltage was set and amperage allowed to vary. In cases where an AC overlay was utilized, 500 kHz frequency with an amplitude of approximately 10% of the DC voltage was applied.

The feed contained, unless noted otherwise, approximately 8 ppm NaCl and 1 to 3 ppm silica. The device was operated at room temperature and nominal dilute flow velocities and had a 13 inch path length. In some cases data from a 26 inch path length was normalized to a 13 inch flow path by taking the square root of the fractional passage obtained on the 26 inch modules. In all cases, product resistivity was 16–17.5 megohm cm.

Low concentrate velocity was that velocity obtained at 80% recovery and no recirculation. High velocity was obtained using recirculation by pumping at 3 to 4 times nominal concentrate velocity. Device water recovery was fixed at 80% unless noted. Low concentrate and/or dilute pH varied from 5.5 to 7. High pH conditions occurred with pH from 9.5 to 11.

In all cases, 6–8% crosslinked gel cation resin was used. The cation membrane was formed from standard (8% crosslinked) cation resin.

TABLE 1

| | | | Silica Removal | | | | |
|---|---|---|---|---|---|---|---|
| Test | Anion Resin Crosslinking | Anion Resin Type | Anion Membrane Crosslinking (Type 1) | Concentrate Velocity | Concentrate pH | AC (KHz) Overlay | % Silica Removal |
| 1 | high | I | high | low | low | no | 63 |
| 2 | high | I | low | low | low | no | 65 |
| 3 | high | I | low | high | low | no | 86 |
| 4 | high | I | low | low | high | no | 92 |
| 5 | high | II | low | low | high | no | 63 |
| 6 | low | I | low | low | low | no | 70 |
| 7 | low | I | low | high | low | no | 95 |
| 8 | low | I | low | low | high | no | 98 |
| 9 | low | I | low | high | high | no | 98 |
| 10 | low | I | low | high | high | no | 98[1] |
| 11 | low | I | low | high | low | no | 95[1] |
| 12 | low | I | low | low | high[2] | no | 98 |
| 13 | high | I | low | low | low | 500 | 80 |
| 14 | low | I | low | high | high | 500 | 99 |
| 15 | low | I | low | high | low | 500 | 98 |
| 16 | low | I | low | low | low | 500 | 75 |

[1]Included 93–97% device water recovery
[2]high pH in both diluting and concentrating streams As is evident from the above data, under all conditions tested, the use of Type I low crosslinked resin and membrane in the device resulted in enhanced silica removal. Resin type, membrane crosslinking and resin crosslinking each appeared to have a significant effect on the performance of the apparatus. As for process parameters, high pH in the concentrating stream had a large effect on silica removal. Under conditions of high concentrate pH, pH in the diluting stream, concentrating stream velocity and water recovery had little effect. However, at low concentrate pH, increased concentrating stream velocity significantly enhanced silica removal. The use of an AC overlay improved the process performance most significantly for high velocity and high pH conditions.

Figure 7:
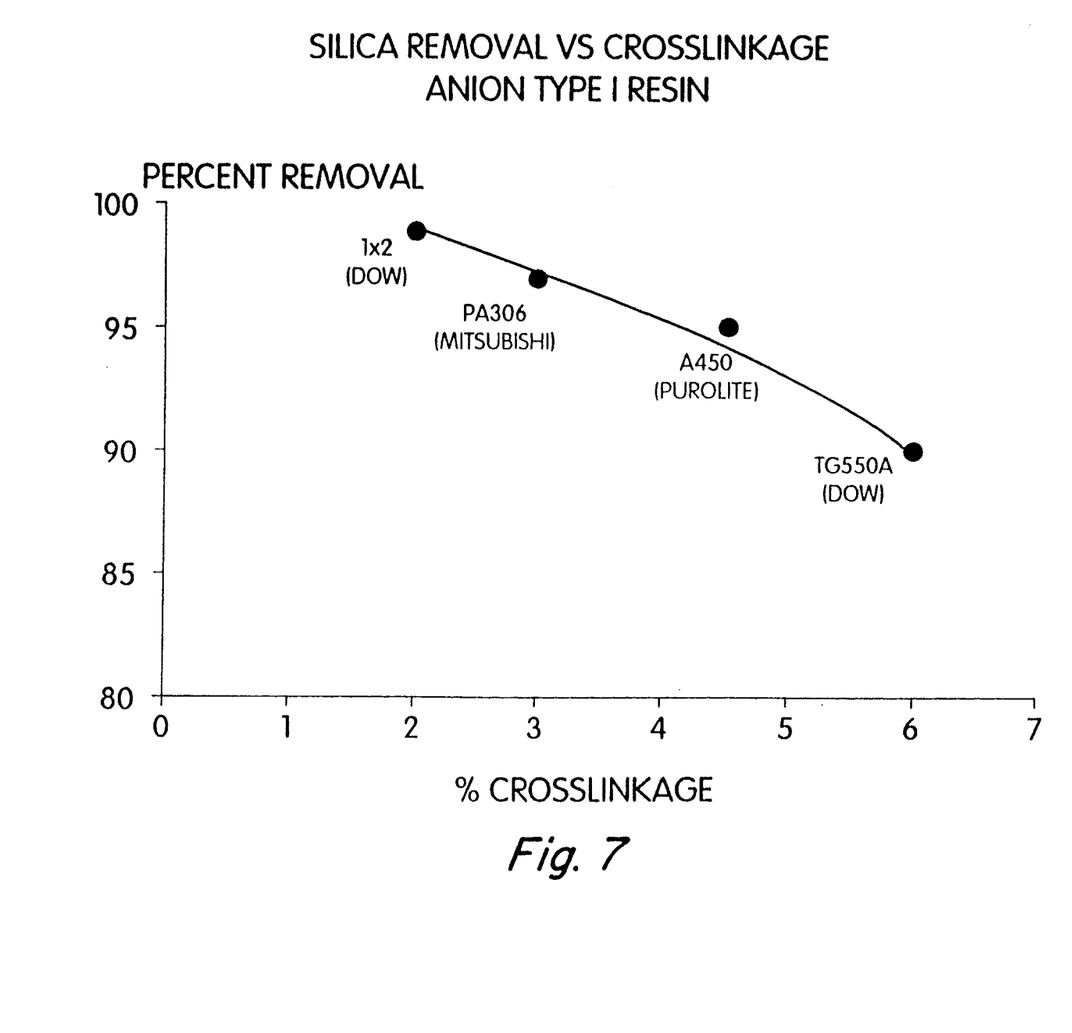
FIG. 7 is a graph plotting silica removal as a function of crosslinking for Type I anion resins using the electrodeionization apparatus of this invention.

Additionally, the percentage of silica removal as a function of resin crosslinking has been obtained and the data are presented in FIG. 7. In FIG. 7, the data points were obtained using equipment with a 13 inch flow path, low crosslinked Type I membranes, high velocity in the concentrating stream, low pH and no AC overlay. In addition, in each case, there was 93-97% water recovery. As is evident from the Figure, the percent of silica removal varied inversely with the crosslinking of the resin.

EXAMPLE 2: Sulfate Removal

This example illustrates the improved separation efficiency obtained with the electrodeionization apparatus of this invention utilizing low crosslinked anion exchange membrane, Type II anion exchange resins, ion exchange media filled concentrate cells and polarity reversal.

Test Conditions

All tests used about 3 or 6 volts DC per cell pair. This voltage was applied with filtered variable DC voltage power supplies with less than 1% ripple. In all cases voltage was set and amperage allowed to vary. Polarity was reversed on regular 15 minute cycles.

The feed contained, unless noted otherwise, $Na_2SO_4$ with NaCl to yield 500-525 micromhos. The device was operated at 13° to 15° C., nominal dilute flow velocities, and had two stages, each with a 13 inch path length. Feed pH varied from 5.0 to 5.3. Device water recovery was fixed at 67%. Dilute velocity was fixed at the nominal flowrate. An AC overlay was not used.

As in the previous example, 6-8% crosslinked gel cation resin was used. The cation membrane was formed from standard (8% crosslinked) cation resin.

Test Conditions

As a control, a module was constructed having a diluting compartment filled with a high water content anion resin mixed with a highly crosslinked cation resin. Each of the resins had a uniform bead size. The concentrating compartment of the module included an unfilled screen as a spacer. The anion membrane was a low crosslinked heterogeneous membrane, and the cation membrane was a high crosslinked heterogeneous membrane. The flow path was normalized to 13 inches.

The module was operated under conditions in which the dilute flow rate was nominal, the concentrate stream was a high velocity, low pH stream with 95% recovery, the electrical current was normalized to 0.27 amps DC, and the feed stream contained a silica concentration of 4000 parts per billion (ppb). Under these conditions, normalized silica removal was 88%.

A second module was constructed, and was similar to the first module with the exception that the concentrating compartment did not have a spacer screen. Rather, the compartment was filled with an ion exchange resin mixture. The resin mixture was the same as that used in the diluting compartment specified above.

This second module was operated under conditions in which the dilute flow rate was nominal, the concentrate stream was a high velocity, low pH stream with 83% recovery, the electrical current was 0.31 amps DC, and the feed stream contained a silica concentration of 1685 ppb. Under these conditions, silica removal was found to be 94.6%.

It has been shown that for a given module design, in the ranges of feed silica and percent recovery provided, typical levels of percent silica removal remain substantially constant. Thus, the above data demonstrates that, as compared to an unfilled concentrating compartment, the use of a resin filled concentrating compartment provides a significant improvement in silica removal.

TABLE II

| | | | | | Sulfate Removal | | | | |
| Test | Feed Salinity (umhos) | $Na_2SO_4$ (ppm) Concentration | Anion Resin Crosslinking | Anion Resin Type | Anion Membrane Crosslinking | Cell Voltage | Salinity Removal Conductivity (%) | $Na_2SO_4$ Removal Weight (%) | Current Efficiency (%) |
| --- | --- | --- | --- | --- | --- | --- | --- | --- | --- |
| 17 | 500 | 237 | high | I | low | 6 | 66 | 65 | 60 |
| 18 | 500 | 237 | high | II | low | 6 | 72 | 83 | 77 |
| 19 | 525 | 75 | high | I | low | 3 | 56 | 68 | 60 |
| 20 | 525 | 75 | high | II | low | 3 | 58 | >99 | 67 |

The above data demonstrates that sulfate removal increased and water splitting decreased when Type II resin was substituted for Type I resin.

For Type II, 6% crosslinked anion resin, (which is much less selective for sulfate than Type I), sulfate conductance relative to hydroxyl approximated the 4%-6% crosslinked, Type I resin. Therefore a functional group change to Type II resin resulted in improved transfer with standard crosslinkage.

For cation resins, a similar relationship was found. The 8% crosslinked, cation exchange resin was much more favorable to hydrogen transfer than the resins having 4% or 6% crosslinking.

EXAMPLE 3: Filled Concentrating Compartment

This example illustrates the ability to enhance silica removal from a process stream by using an electrodeionization system having a concentrating compartment filled with an ion exchange resin.

EXAMPLE 4: Constant Current Mode Operation

This example illustrates the elimination of silica spikes by operating an electrodeionization apparatus in the constant current mode.

Test Conditions

As a test bed, a module was constructed having a diluting compartment filled with a mixture of highly crosslinked anion and cation resins. Each of the resins had a uniform bead size. The concentrating compartment of the module included an unfilled screen as a spacer. The anion membrane was a low crosslinked heterogeneous membrane, and the cation membrane was a high crosslinked heterogeneous membrane. The flow path was normalized to 13 inches.

Initially, the system was run under conventional, constant voltage conditions in which the dilute flow rate was approximately one half nominal, and the concentrate stream was a low velocity, low pH stream with 90% recovery. The power supply provided 0.31 amps of direct current at 18 volts. Under these conditions, a feed stream having an initial silica concentration of 3500 ppb was purified to a product having 76 ppb and a resistivity of 15 megohm-cm.

To demonstrate the silica spike effect, the module was fed high resistivity water. Feed to the diluting stream had a silica concentration of 3200 ppb. After 15 minutes, and while maintaining a constant voltage of 18 VDC, the amperage of the system dropped to 0.17 amps. The product had a silica concentration of 144 ppb and a resistivity of 15 megohm-cm. Thus, a decrease in impurity concentrations to the module nearly doubled the silica impurity concentration in the product when the system was operated in the constant voltage mode. In all cases, the product resistivity remained constant, demonstrating that it was not affected by the test.

To demonstrate the effects of constant current mode operation, the same module as above was operated at 19 VDC and 0.4 amps. The feed stream contained a silica concentration of 3500 ppb. The resulting product had a silica concentration of 56 ppb and a resistivity of 15 megohm-cm.

The module was then fed high resistivity water. Feed to the diluting stream had a silica concentration of 3400 ppb. The current was maintained at a constant 0.4 amps. After 15 minutes, the voltage was measured, and was found to have increased to 27.5 VDC. The product stream had a resistivity of 15 megohm cm and a silica concentration of 63 ppb.

As demonstrated above, in the constant voltage mode of operation, decreases of contaminant concentration in the feed result in significant silica contaminant concentrations in the product. In contrast, when operated in the constant current mode, a decrease of contaminant concentration in the feed results in only an inconsequential increase of silica contaminant concentration in the product.

Although specific features of the invention are shown in some drawings and not in others, it is for convenience only as each feature may be combined with any or all of the other features in accordance with the invention.

It should be understood, however, that the foregoing description of the invention is intended merely to be illustrative thereof and that other modifications, embodiments, and equivalents may be apparent to those skilled in the art without departing from its spirit.

Various objects of the invention generally can be achieved by using an electrodeionization apparatus having a membrane or resin whereby a substantial increase in voltage across the membrane or resin is capable of causing a substantial increase in the transfer of weakly ionized, highly charged, or large and highly hydrated ions. As described above, this may be achieved through the use of a Type I or Type II: anion resin, or a cation resin, having relatively lowered cross-linking. It will be understood by those of ordinary skill in the art that other membrane and/or resin types can be substituted or added consistent with this invention. For example, the invention permits selecting a resin having a relatively increased selectivity for nitrate or metal ions such that transfer of these species relative to hydroxide or hydrogen ions is enhanced.

Having thus described the invention, what we desire to claim and secure by Letters Patent is:

We claim:

1. Electrodeionization apparatus comprising an ion exchange resin positioned between an anion exchange membrane and a cation exchange membrane, the membranes having a conductance, wherein at least one membrane comprises a material that, when subjected to an increase in voltage across the membrane causing an increase in electric current across the membrane on the order of two times or less, allows an increase in the transfer of large or highly charged ions across the membrane on an equivalent weight basis of 25% or more, the apparatus including at least one concentrating compartment, said concentrating compartment having an ion exchange resin contained therein.

2. Electrodeionization apparatus as claimed in claim 1 wherein the ion exchange resin contained in the concentrating compartment comprises an anion exchange resin, a cation exchange resin or a mixture thereof.

3. Electrodeionization apparatus as claimed in claim 2 wherein the composition of the ion exchange resin in the concentrating compartment is the same as that of an ion exchange resin contained in an adjacent compartment.

4. Electrodeionization apparatus as claimed in claim 1, the apparatus further including an electrical current source constructed and arranged to allow operation of the apparatus under conditions in which electrical current is maintained at a substantially constant level.

5. Electrodeionization apparatus as claimed in claim 1, the apparatus further constructed and arranged to allow the concentrating compartment to be pressurized to a level sufficiently high to maintain substantially all dissolved $CO_2$ in solution.

6. Electrodeionization apparatus as claimed in claim 5, the apparatus constructed and arranged to allow the concentrating compartment to be pressurized to a level sufficiently high to maintain substantially all dissolved gasses in solution.

7. Electrodeionization apparatus comprising an ion exchange resin positioned between an anion exchange membrane and a cation exchange membrane, the membranes having a conductance, wherein at least one membrane comprises a material that, when subjected to an increase in voltage across the membrane causing an increase in electric current across the membrane on the order of two times or less, allows an increase in the transfer of large or highly charged ions across the membrane on an equivalent weight basis of 25% or more, the ion exchange resin comprising a plurality of ion exchange resin beads having a substantially uniform bead size.

8. In the method of using electrodeionization apparatus adapted to remove ions from a liquid, the apparatus comprising an ion exchange resin positioned between an anion exchange membrane and a cation exchange membrane, the membranes having a conductance, wherein at least one membrane comprises a material such that, when subjected to an increase in voltage across the membrane causing an increase in electric current across the membrane of the order of two times or less, allows an increase and the transfer of weakly ionized, large or highly charged ions across the membrane on an equivalent weight basis of 25% or more, the improvement which comprises operating the apparatus under conditions in which electrical current is maintained at a substantially constant level.

9. Electrodeionization apparatus comprising an ion exchange resin positioned between an anion exchange membrane and a cation exchange membrane, the membranes having a conductance, wherein at least one membrane comprises a material such that, when subjected to an increase in voltage across the membrane causing an increase in electric current across the membrane of the order of two times or less, allows an increase in the transfer of weakly ionized, large or highly charged ions across the membrane on an equivalent weight basis of 25% or more, the apparatus further including an electrical current source constructed and arranged to provide the apparatus with a substantially constant electrical current level.

10. Electrodeionization apparatus comprising an ion exchange resin positioned between an anion exchange membrane and a cation exchange membrane, the membranes having a conductance, wherein at least one membrane comprises a material such that, when subjected to an increase in voltage across the membrane causing an increase in electric current across the membrane of the order of two times or less, allows an increase in the transfer of weakly ionized, large or highly charged ions across the membrane on an equivalent weight basis of 25% or more, and further including at least one concentrating compartment, the apparatus constructed and arranged to allow the concentrating compartment to be pressurized to a level sufficient to maintain substantially all dissolved $CO_2$ in solution.

11. Electrodeionization apparatus as claimed in claim 10 wherein substantially all dissolved gasses are maintained in solution.

12. In the method of using electrodeionization apparatus adapted to remove ions from a liquid, wherein the apparatus comprises an ion exchange resin positioned between an anion exchange membrane and a cation membrane, the membranes having a conductance, wherein at least one membrane comprises a material such that, when subjected to an increase in voltage across the membrane causing an increase in electric current across the membrane of the order of two times or less, allows an increase in the transfer of weakly ionized, large or highly charged ions across the membrane on an equivalent weight basis of 25% or more, and wherein the apparatus further includes at least one concentrating compartment, the improvement which comprises maintaining pressure in the concentrating compartment at a level sufficiently high to maintain substantially all dissolved $CO_2$ is solution.

13. The improvement of claim 12 wherein the apparatus is operated under conditions of elevated pressure in the concentrating compartment sufficiently high to maintain substantially all dissolved gasses in solution.

14. Electrodeionization apparatus containing an ion exchange resin positioned between an anion exchange membrane and a cation exchange membrane, wherein at least one of said membranes comprises an ion exchange resin selected from the group consisting of anion exchange resins that are crosslinked at less than about 6% and cation exchange resins that are crosslinked at less than about 8%, the apparatus further including at least one concentrating compartment having an ion exchange resin contained therein.

15. Electrodeionization apparatus as claimed in claim 14 wherein the ion exchange resin contained in the concentrating compartment comprises a plurality of ion exchange resin beads having a substantially uniform bead size.

16. Electrodeionization apparatus as claimed in claim 14 wherein the ion exchange resin positioned between said membranes comprises a plurality of ion exchange resin beads having a substantially uniform bead size.

17. Electrodeionization apparatus as claimed in claim 14, constructed and arranged to allow operation of the apparatus under conditions in which electrical current across the apparatus is maintained at a substantially constant level.

18. Electrodeionization apparatus as claimed in claim 14, constructed and arranged to allow the concentrating compartment to be pressurized to a level sufficiently high to maintain substantially all dissolved $CO_2$ in solution.

19. Electrodeionization apparatus as claimed in claim 18, wherein the concentrating compartment is pressurized sufficiently high to maintain substantially all dissolved gasses in solution.

20. Electrodeionization apparatus comprising an ion exchange resin positioned between an anion exchange membrane and a cation exchange membrane, wherein at least one of said membranes comprises an ion exchange resin selected from the group consisting of anion exchange resins that are crosslinked at less than about 6% and cation exchange resins that are crosslinked at less than about 8%, the apparatus further including an electrical current source constructed and arranged to provide a substantially constant electrical current across the apparatus.

21. Electrodeionization apparatus comprising an ion exchange resin positioned between an anion exchange membrane and a cation exchange membrane, wherein at least one of the membranes comprises an ion exchange resin selected from the group consisting anion exchange resins that are crosslinked at less than about 6% and cation exchange resins that are crosslinked at less than about 8%, the apparatus further including at least one concentrating compartment being constructed and arranged to allow the concentrating compartment to be pressurized to a level sufficiently high to maintain substantially all dissolved $CO_2$ in solution.

22. Electrodeionization apparatus as in claim 21 wherein the concentrating compartment is pressurized sufficiently high to maintain substantially all dissolved gasses in solution.

* * * * *